United States Patent [19]

Kirsch et al.

[11] 4,201,833

[45] * May 6, 1980

[54] BUILDING MATERIAL ELEMENTS, PARTICULARLY BUILDING BOARDS, AND A PROCESS FOR THEIR PRODUCTION

[75] Inventors: Kurt Kirsch, Vienna; Volkmar Hilzensauer, Amstetten; Günther Pflug, Vienna; Felix Wehrmann, Vienna; Gerald Maresch, Vienna, all of Austria

[73] Assignee: Isovolta Osterreichische Isolierstoffwerke Aktiengesellschaft, Winer Neudorf, Austria

[ * ] Notice: The portion of the term of this patent subsequent to Jun. 6, 1995, has been disclaimed.

[21] Appl. No.: 888,953

[22] Filed: Mar. 22, 1978

Related U.S. Application Data

[62] Division of Ser. No. 657,273, Feb. 11, 1976, Pat. No. 4,093,488, which is a division of Ser. No. 450,847, Mar. 13, 1974, abandoned.

[30] Foreign Application Priority Data

Mar. 16, 1973 [AT] Austria .................................. 2385/73
Dec. 12, 1973 [AT] Austria ................................ 10381/73
Feb. 21, 1974 [AT] Austria .................................. 1400/74

[51] Int. Cl.² ........................ B32B 5/02; B32B 27/42; C08J 9/00

[52] U.S. Cl. ..................................... 428/404; 428/407; 428/920; 428/921; 264/120

[58] Field of Search ............... 428/539, 921, 426, 920, 428/404, 407; 264/109, 120, 122; 260/2.5 FP; 106/15 FP

[56] References Cited

U.S. PATENT DOCUMENTS

| | | | |
|---|---|---|---|
| 3,448,181 | 6/1969 | Olstowski et al. ................... | 264/120 |
| 3,728,209 | 4/1973 | Sugaike et al. ................... | 428/921 X |
| 3,766,100 | 10/1973 | Meyer-Stoll et al. .......... | 260/2.5 FP |
| 3,813,356 | 5/1974 | Lievremont et al. ...... | 260/2.5 FP X |
| 3,817,822 | 6/1974 | Dawes ............................. | 428/921 X |
| 3,830,687 | 8/1974 | Re et al. ........................... | 428/920 X |
| 3,915,905 | 10/1975 | Hanton ....................... | 260/2.5 FP X |

FOREIGN PATENT DOCUMENTS 1421400 10/1964 France .

*Primary Examiner*—Marion E. McCamish
*Assistant Examiner*—Daniel R. Zinker
*Attorney, Agent, or Firm*—Hammond & Littell, Weissenberger and Muserlian

[57] ABSTRACT

An incombustible building element with good thermal insulation properties produced by spraying granules of vermiculite with an organic binder, prepressing the coated granules into a biscuit and heating and pressing the biscuit in a press to transform it into a building material element.

7 Claims, No Drawings

BUILDING MATERIAL ELEMENTS, PARTICULARLY BUILDING BOARDS, AND A PROCESS FOR THEIR PRODUCTION

PRIOR APPLICATION

This application is a division of our copending, commonly assigned U.S. patent application Ser. No. 657,273 filed Feb. 11, 1976, now U.S. Pat. No. 4,093,488 which in turn is a division of our copending application Ser. No. 450,847 filed Mar. 13, 1974, now abandoned.

The invention relates to incombustible building material elements, particularly building boards, which have good thermal insulation properties.

Incombustible building material elements generally consist of inorganic materials. For example, shaped elements, such as boards or blocks, which can be used as light-weight building elements, are obtained by mixing expanded materials, such as expanded mica, with plaster or cement and suitable shaping after setting. The relatively high proportion of binding or cementing agents, which is necessary in order to achieve adequate binding of the expanded materials, leads in most cases to relatively long setting times or to elements which have only poor thermal insulation properties. In addition building elements of this kind can generally be worked only with difficulty or with considerable wear of the material.

From Swiss Patent Specification No. 519,639 it is now also known for expanded mica and an inorganic incombustible binder to be mixed in the volumetric proportion of 9:1, and for the mixture to be pressed into building elements. The amount of binder required in this process is also relatively great.

The problem underlying the invention now consists in providing building elements, particularly building boards, which contain a resin-bound inorganic material, such as expanded material, slag wool, fly ash, and a process for their production, wherein a very small proportion of the organic binders used is sufficient, while despite the use of these organic binders an incombustible building element is obtained which has good heat insulation properties and which in addition provides good sound insulation.

This problem is solved by the building material element of the invention, which is characterized in that it contains an organic binder consisting of a resin mixture or mixed resin, with at least one combustible resin component and at least one incombustible nitrogen-containing resin component. The combustible resin component is advantageously a phenol resin and/or the incombustible nitrogen-containing resin component is a urea resin, while the content of urea resin component in the resin mixture or mixed resin amounts to from 10 to 25 mole percent.

If fires should occur the action of heat on the urea resin in a building element of this kind will produce an atmosphere having a high nitrogen content, which will prevent the combustion of the combustible resin component (phenol resin) to such an extent that carbonization does not occur but only so-called coalification, through which a dense thermally stable layer of carbon is formed on the surface of the building element.

Vermiculite, perlite, expanded clay, or mixtures thereof have for example proved to be advantageous expanded materials.

According to a further advantageous development of the invention, the building material element is characterized in that in addition to the organic binder it contains waterglass as additional binder. The proportion of waterglass in the entire quantity of binder, calculated as solid material, amounts to at least 10% by weight. The addition of waterglass to the binder has, among other results, the effect of increasing the fire resistance of the building material element of the invention.

The problem underlying the invention is in addition solved by a process for the production of a buildng material element containing expanded material, which process is characterized in that the expanded material granulate is sprayed with the binder while being stirred, the amount of resin applied, referred to the expanded material and calculated as solid substance, being from 2 to 30% by weight, the granulate coated with binder in this manner being shaped or pressed into mouldings in heated hydraulic presses. The moisture content of the granulate coated with binder is for this purpose advantageously reduced to below 7% and the treated granulate then pressed in a press heated by high frequency.

According to another advantageous development of the process of the invention the granulate treated with binder is precompressed at room temperature, removed from the mould, and thereupon pressed and thermally cured. The granulate removed from the mould has sufficient strength resulting from the precompression to form a stable biscuit which can be introduced into the press without requiring special transport means, such as plates or belts.

According to a further advantageous development of the process of the invention, strengthening or reinforcing elements are introduced during the spraying of the granulate with the binder, whereupon the granulate is preferably precompressed and then pressed into the final building element. Glass fibres, glass filaments, and the like are particularly suitable as strengthening or reinforcing elements.

The building material element of the invention, particularly in the form of a building board, can be integrated to form a multi-layer board direct during its manufacture. According to an advantageous development of the process of the invention a multi-layer board of this kind can be produced by pressing the granulate treated with binder, or the precompressed biscuit, with cover sheets previously treated with binder or together with external cover boards. Through a multi-layer construction of this kind, for example using paper, glass fleece, aluminum foil, and the like, an improvement of the mechanical strength of the resulting board is achieved.

In another advantageous development of the invention the process in which the granulate treated with binder and containing an expanded material is first precompressed and shaped or pressed into mouldings in heated hydraulic presses, is further characterized in that in addition to the spraying with the organic binder, spraying of the granulate with waterglass is effected with the aid of separate spraying means.

It is true that Swiss Patent Specification No. 187,051 has disclosed a building board which is composed of expanded mica with waterglass as binder. When an inorganic binder such as waterglass is used it is however generally necessary to use a substantially higher proportion of binder than when organic binders are employed. Furthermore, with binders such as waterglass, which give up a relatively large amount of water on setting, the difficulty of removing this water sufficiently quickly arises, and this generally leads to relatively long pressing times. The use of waterglass as binder for building elements has therefore not been very widespread.

In the process of the invention, in which both an organic binder and waterglass are used, a substantially smaller amount of waterglass is required than in the abovementioned known process according to CH-PS No. 187,051, since a large part of the binder action is supplied by the organic binder. Since however the organic binder fraction gives up only relatively small amounts of water on setting, substantially smaller amounts of water have to be removed in the method of the invention and it is possible to manage with substantially shorter heating times than would be the case for a building material element in which waterglass was the only binder.

Because the expanded material granulate is sprayed separately with the organic binder and with waterglass, a binder film is produced which contains both these products, namely the organic binder and the waterglass. In this binder film there now takes place a precipitation reaction by which the film is converted to a jelly-like consistency. It is found that after its precompression the granulate coated in this manner produces substantially stronger preformed elements than in the case of coating with the organic binder or waterglass alone.

Some preferred examples of the process of the invention are given below.

EXAMPLE 1

600 liters (50 kg) of vermiculite of the grain size 0.5 to 3 mm are mixed by spraying in a free-fall mixer with 12 liters of a 70% aqueous resin mixture consisting of 85 mole % of phenol formaldehyde resin and 15 mole % of urea formaldehyde resin, in such a manner that the grains of the expanded mica are uniformly wetted. The resin-coated granulate obtained in this manner is compressed uniformly in a suitable unheated prepressing apparatus at a pressure of about 1.5 kp/cm² to 50% of its original bulk volume, whereby a transportable moulded product is obtained. The latter is thereupon cured in a press equipped with a high frequency and/or thermal heating system, together with cover sheets of kraft paper coated with resin on one side, at a pressure of from 2 to 3 kp/cm² and with a press temperature of 150° to 170° C. The moulded product is removed from the mould in the hot state and cut to the desired size.

In the test for combustibility no asphyxiating or combustible vapors or gases occur, the material glows when subjected to the action of a flame, in accordance with the temperature produced, and after removal of the flame no further burning can be observed.

The building material produced in accordance with the example has a unit weight of 350 to 400 kg/m³ and possesses a bending strength of from 40 to 50 kg/cm².

EXAMPLE 2

For the production of a mixed resin solution 1 kilomole of phenol (94 kg), 0.15 kilomole of urea (9 kg) and 1.6 kilomole of formaldehyde (120 kg, 40 weight % solution) are catalyzed with sodium hydroxide solution and condensed to form a mixed resin at 80°–100° C. The resin solution is thereupon concentrated to 70% solid material by vacuum distillation.

600 liters (50 kg) of vermiculite of the grain size 0.5 to 3 mm are mixed in a free-fall mixer with 12 liters of this 70% mixed resin solution by spraying, similarly to Example 1.

The granulate coated in this manner is then further processed as described in Example 1.

EXAMPLE 3

600 liters (15 kg) of vermiculite of the grain size 0.5 to 3 mm are sprayed in a free-fall mixer on the one hand with 5.4 liters (6.21 kg) of the mixed resin solution described in Example 2 and on the other hand, by means of a separate spraying device, with 5.4 liters (8.10 kg) of sodium waterglass of 48°–50° Be, in such a manner that the grains of the expanded mica are uniformly wetted. The granulate coated in this manner is compressed uniformly in a suitable unheated prepressing apparatus at a pressure of 1.5 kp/cm² to 50% of its original bulk volume, whereby a transportable moulded product is obtained. The latter is thereupon cured in a press equipped with a high frequency and/or thermal heating system, while at the same time pressing cover sheets of kraft paper, coated with resin on one side, at a pressure of from 2 to 3 kp/cm² and with a press temperature of 150° to 170° C. The moulded product is removed from the mould in the hot state and cut to the desired size.

The board-like building element produced in accordance with this Example has a unit weight of 350–400 kg/m³ and possesses a bending strength of from 45 to 55 kp/cm².

EXAMPLE 4

In the production of a building element in board form the procedure is as in Example 3, with the exception that 600 liters (50 kg) of vermiculite are now used with only 4.2 liters (4.83 kg) of mixed resin solution but with a higher proportion of waterglass, namely 6.7 liters (10.05 kg) of sodium waterglass, the quality being the same in each case as in Example 1.

The building material element obtained has a unit weight of 350–400 kg/m³ and a bending strength of 45–55 kp/cm² as in Example 3, but because of the higher proportion of waterglass in the binder has greater resistance to fire.

We claim:

1. An incombustible building material element having good thermal insulation properties produced by
   (a) spraying the surface of vermiculite granules, while agitating the granules, with a liquid containing an organic binder comprised of a resin mixture or mixed resin having at least one combustible resin component and at least one incombustible nitrogen-containing resin component, wherein the amount of resin, calculated as solid substance, coated on the granules is 2 to 30% by weight, based on the weight of the granules,
   (b) placing the coated granules in a first press and pressing the coated granules without heating to bond them to form a transportable molded product,
   (c) placing the transportable molded product in a second press provided with a heating means, and
   (d) pressing and heating the transportable molded product at an elevated temperature to further bond the granules and organic binder in the molded product to form an incombustible building material element with good thermal insulation properties.

2. The molded product of claim 1 wherein the element is provided with at least one outer cover sheet coated on the inside with resin, the said cover sheet being a member selected from the group consisting of paper, glass fleece and aluminum foil.

3. A building material element of claim 1 wherein the combustible resin component is a phenol resin.

4. A building material element of claim 1 wherein the incombustible nitrogen-containing resin component is a urea resin.

5. A building material element of claim 1 wherein the content of urea resin component in the resin mixture or mixed resin amounts to from 10 to 25 mole %.

6. A building material element of claim 1 wherein in addition to the organic binder it contains waterglass as additional binder.

7. A building material element according to claim 6, characterized in that the proportion of waterglass in the entire amount of binder, calculated as solid material, amounts to at least 10% by weight.

* * * * *